United States Patent [19]

Stone et al.

[11] 3,949,682
[45] Apr. 13, 1976

[54] TOWLINE THERMAL PROTECTION SYSTEM

[75] Inventors: W. James Stone; Michael J. Ripley, both of China Lake; Leroy M. Stayton, Ridgecrest, all of Calif.

[73] Assignee: The United States of America as represented by the Secretary of the Navy, Washington, D.C.

[22] Filed: June 10, 1974

[21] Appl. No.: 478,011

[52] U.S. Cl. ............. 102/89; 244/122 AD; 244/141
[51] Int. Cl.² .......................................... B64D 25/08
[58] Field of Search. 244/122 AB, 122 AD, 122 Ac, 244/141, 113, 3.12, 138 R; 87/1, 7, 8, 9; 102/105, 89; 89/1 B, 1 G; 294/74

[56] References Cited
UNITED STATES PATENTS

| | | | |
|---|---|---|---|
| 2,751,171 | 6/1956 | Martin | 244/141 |
| 2,783,173 | 2/1957 | Walker et al. | 102/105 X |
| 3,058,702 | 10/1962 | Sharples et al. | 244/113 |
| 3,264,135 | 8/1966 | Wakelyn et al. | 102/105 |
| 3,317,233 | 5/1967 | Black | 294/74 |
| 3,424,409 | 1/1969 | Stanley | 244/141 X |
| 3,468,214 | 9/1969 | Worcester et al. | 102/89 |
| 3,583,275 | 6/1971 | Duflas | 87/8 X |
| 3,583,751 | 6/1971 | White | 294/74 |
| 3,722,942 | 3/1973 | Baur | 294/74 |
| 3,745,928 | 7/1973 | Kinnaird et al. | 102/105 |
| 3,807,671 | 4/1974 | Stencel | 244/138 R |

*Primary Examiner*—Trygve M. Blix
*Assistant Examiner*—Galen Barefoot
*Attorney, Agent, or Firm*—R. S. Sciascia; Roy Miller; Gerald F. Baker

[57] ABSTRACT

An improved tow line and attachment apparatus for use with a rocket motor utilized in carrying a line, towing a load or extracting an aircrew member from a disabled aircraft. The tow or pendant line is attached to the rear end of a rocket motor adjacent its nozzles and sustains the load to be carried during powered flight. Flame and heat exiting from the nozzles during powered flight from the burning propellant can impinge a pendant line attached adjacent the nozzles. To prevent weakening or destruction of this portion of the tow line a silicone rubber envelope is fabricated around the line.

5 Claims, 3 Drawing Figures

TOWLINE THERMAL PROTECTION SYSTEM

CROSS REFERENCE TO RELATED APPLICATIONS

Reference is made to Assignee's copending applications (Ser. No. 478,012, Ser. No. 478,008, Ser. No. 478,010, now U.S. Pat. No. 3,893,367, and Ser. No. 478,009) filed of even date which relate to a rocket motor utilized to tow a line or load.

BACKGROUND OF THE INVENTION

1. Field of Invention

The invention relates to an improved tow line utilized for attachment to a rocket motor in close proximity with the rocket nozzles.

2. Background of Invention

An important feature of the improved two line is to allow its use in the vicinity of high temperatures and impinging flame without weakening or destroying a portion of the tow line. The process of coating in line with a flexible heat resistant material in the region of the line subject to the flame and heat permits the design of a line that is not impaired as to its flexibility or strength and is inexpensive to fabricate in large or small quantities.

Due to the need in recent years for lighter, simpler and more effective rocket motors for carrying lines or carrying a load at the end of a line, for example to extract crew members to a safe distance from a disabled aircraft, it has been necessary to provide a rocket motor apparatus with rear end rocket nozzles. Rockets having this type of structural configuration have been found to be more stable in flight and smaller and lighter in weight than rockets presently in use.

Prior art devices have used various techniques to attach the tow line as far away from the nozzles as physically possible. This has led to the development of rockets with nozzles attached to the head end of a rocket motor. Normally these rocket motors require additional stability in flight so they are usually spin stabilized by allowing or causing the rocket motor to rotate abouts its longitudinal axis during powered flight. The line attached to the rocket motor is prevented from twisting and corkscrewing by the use of a bearing mechanism or like device which inherently adds complex and relatively heavy structure to the rocket motor.

The present unique coated tow line overcomes the disadvantage of using a line in the vicinity of the rocket nozzles and permits the use of a small, simple, light-weight rocket motor in line carrying or aircrew escape system apparatus.

SUMMARY OF INVENTION

The purpose of the invention is to provide an improved tow line apparatus and attachment means for use in the vicinity of a rocket nozzle blast that will be impervious to the heat and flame created by the burning rocket propellant. The tow line is a nylon rope covered with a silicon rubber-like material that maintains the flexibility of the tow line and yet does not deteriorate in the presence of high temperature flame or gases. The covered tow line is looped through a shackle having a nylon bushing and held in place by lashing means adjacent the shackle. This permits the two ends of the tow line to be fastened to a load or to an aircrew member's parachute harness at a two point attachment without the necessity of a specially manufactured tow line.

BRIEF DESCRIPTION OF THE DRAWINGS

Referring now to the drawings depicted by FIG. 1 wherein like figure element numbers pertain to the same elements and structural features of the various figures, FIG. 1 illustrates rocket motor 10 having a boss portion 21 positioned at the rear portion of rocket motor 10 adjacent rocket nozzles 15, 17 and 18. A shackle 22 having a generally wye shaped configuration is held to boss 21 by means of threads 32. A hole 33 in shackle 22 permits a bushing or thimble element to be held within its wye or forked portion by means of a pin or other similar fastening means. Tow line 28 fits snugly in a trough like portion formed in thimble 22, this is best shown with reference to FIG. 2, when threaded through shackle 22 (see Figure 2).

Figure 1:
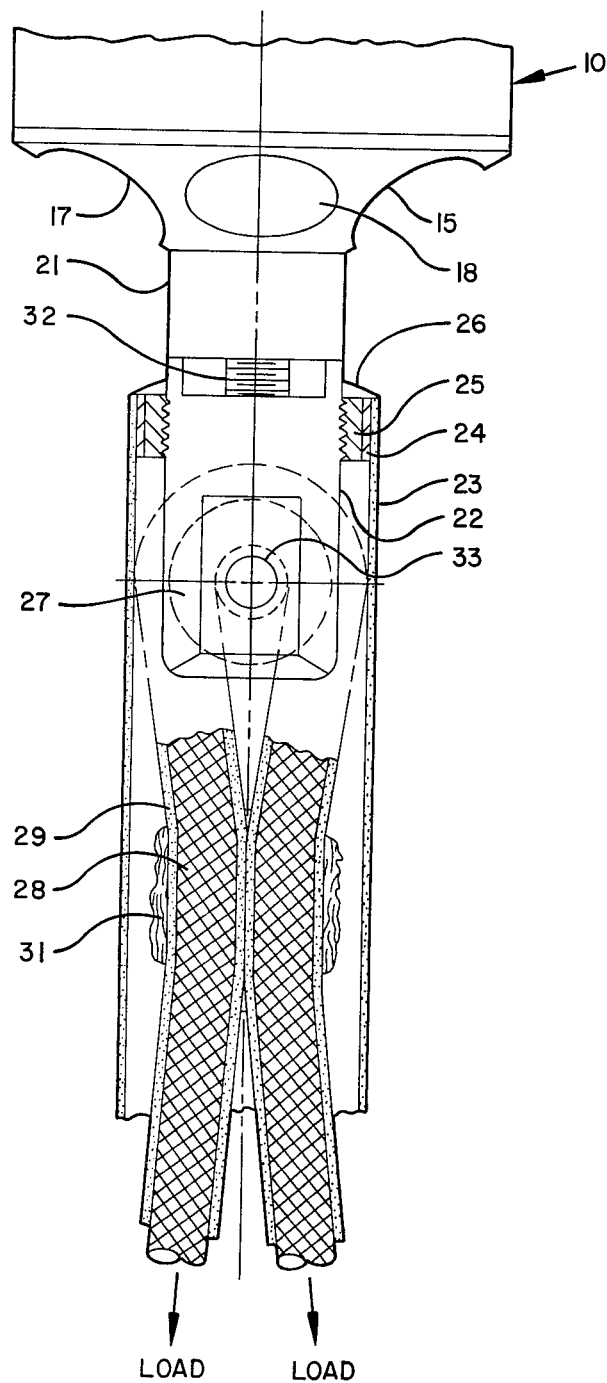
FIG. 1 is a side elevational view of a tow line partly in cross section attached to the rear end of a rocket motor.
Figure 2:
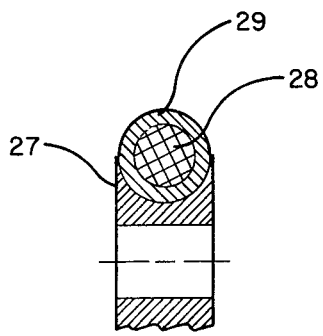
FIG. 2 is a cross sectional view of the tow line over the bushing positioned in the shackle.

A flexible line 28 is covered with a rubber-like heat resistant material 29, such as silicone rubber or the like, over a portion of line 28 adjacent the rocket nozzles. Line 28 may be, if desired, covered over its entire length rather than just a portion of its length as shown. Additionally, a tube 23 of rubber-like material may be used to protect the thimble and lower shackle portion. Tube 23 is attached to a collar 25 by means of adhesive 24. Additional amounts of rubber material are formed as a fillet 26 over the top of collar 25 and the end of tube 23 to further protect the tow line attachment.

Figure 3:
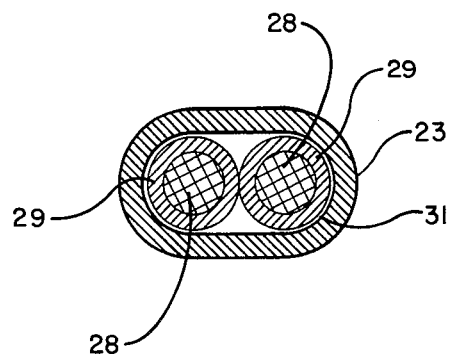
FIG. 3 is a cross sectional view of the tow line and external cover at the lashing point or binding portion.

Tow line 28 is securely held in place around thimble 27 by means of lashing cord 31, best shown with reference to FIG. 3, wrapped over the exterior of both sections of tow line 28 for holding them tightly engaged along a substantial portion of their length. This allows a loop of tow line to be formed over thimble 27 and prevents slipping of the line over the thimble when unequal loads are applied to the two ends of the tow line. The rubber-like covering 29 also prevents sliding of the lashing along the lines and slippage of the tow lines parallel to one another in the area where they are lashed together.

In operation a load or aircrew member is attached to the two ends of the tow line labeled load by means of a harness, straps or the like. Rocket motor 10 is launched and powered flight is initiated by a force exerted on the tow line by the load causing ignition of propellant inside rocket 10. The burning propellant gases exit from nozzles 15, 17 and 18 and these hot gases impinge tubular member 23 and tow line coating 29. The flame and force of the gas against the line may cause removal of some material but the cover is of sufficient thickness to prevent complete wearing away of the protective cover during the time of powered rocket flight.

The covering of a tow line with an ablative material such as silicone rubber and attachment of the line to the nozzle end of a rocket motor permits the use of a simple light weight flexible line with a rocket motor that is used to tow a line or load fastened to the nozzle end of the motor.

Although the preferred embodiment has been described, it will be understood that within the purview of this invention various changes may be made in the form, details, proportion and arrangement of parts, the combination thereof and mode of operation, which generally stated consist in a device capable of carrying out the features set forth, as disclosed in the appended claims.

What is claimed is:

1. A tow line apparatus for use with an aft end rocket nozzle motor utilized to tow a load fastened concentric with the center of the rocket motor and rearward of its nozzles comprising:

shackle means attached with its center concentric with the longitudinal axis and to the rear of a rocket motor;

heat resistant covered tow line passing through said shackle means for forming a double tow line to be attached to a load at its free ends, said heat resistant covered tow line is coated with an exterior layer of ablative material; and lashing means binding said tow line at a point adjacent said shackle means positioned between said shackle means and said load for forming said tow line in a loop about said shackle means;

whereby exhaust gases produced during powered flight of the rocket motor can not damage the tow line.

2. The tow line apparatus of claim 1 further comprising:

a flame resistant cover fastened to said heat resistant covered tow line.

3. The tow line apparatus of claim 1:

wherein said heat resistant covered tow line is a nylon rope

4. The tow line apparatus of claim 3:

wherein said ablative material is a silicone rubber.

5. The tow line apparatus of claim 1:

wherein said shackle means is a forked shaped element adapted to be rigidly fastened opposite its forked end to the rocket motor and said forked shaped element has a nylon bushing fastened between the forked portion.

* * * * *